United States Patent
Ferraris

(10) Patent No.: US 12,438,831 B2
(45) Date of Patent: Oct. 7, 2025

(54) ADVANCED COMMUNICATIONS SYSTEM

(71) Applicant: Rolling Square, Chiasso (CH)

(72) Inventor: Carlo Edoardo Ferraris, Chiasso (CH)

(73) Assignee: Rolling Square, Chiasso (CH)

( * ) Notice: Subject to any disclaimer, the term of this patent is extended or adjusted under 35 U.S.C. 154(b) by 0 days.

(21) Appl. No.: 18/883,991

(22) Filed: Sep. 12, 2024

(65) Prior Publication Data

US 2025/0039110 A1 Jan. 30, 2025

Related U.S. Application Data

(63) Continuation of application No. 18/786,512, filed on Jul. 28, 2024, now abandoned.

(60) Provisional application No. 63/529,635, filed on Jul. 28, 2023.

(51) Int. Cl.
*H04L 51/02* (2022.01)
*H04L 51/046* (2022.01)

(52) U.S. Cl.
CPC ............ *H04L 51/02* (2013.01); *H04L 51/046* (2013.01)

(58) Field of Classification Search
CPC ............... H04L 51/02; H04L 51/046
See application file for complete search history.

(56) References Cited

U.S. PATENT DOCUMENTS

| | | | |
|---|---|---|---|
| 11,146,522 B1* | 10/2021 | Rao | H04L 51/066 |
| 11,483,410 B1* | 10/2022 | Fleck | H04L 51/046 |
| 2013/0111365 A1* | 5/2013 | Chen | H04L 51/043 |
| | | | 715/756 |
| 2016/0098992 A1 | 4/2016 | Renard et al. | |
| 2019/0036849 A1* | 1/2019 | Uppala | H04L 51/02 |
| 2020/0137230 A1 | 4/2020 | Spohrer | |
| 2020/0342874 A1* | 10/2020 | Teserra | G06F 40/263 |
| 2020/0374394 A1* | 11/2020 | Karp | G06F 9/54 |
| 2021/0174187 A1* | 6/2021 | Han | H04L 12/2823 |

FOREIGN PATENT DOCUMENTS

WO 2022005865 A1 1/2022

OTHER PUBLICATIONS

World Intellectual Property Organization, Application No. PCT/IB24/57286, International Search Report dated Nov. 26, 2024.

\* cited by examiner

*Primary Examiner* — Soe Hlaing
(74) *Attorney, Agent, or Firm* — Shield Intellectual Property PC; Kirk D. Wong

(57) ABSTRACT

A hands-free communications system that evaluates user utterances by performing speech to text conversions, evaluating the text, and connecting the user to other users or artificial intelligence (AI) agents. Instant, real-time communications channels are created between the user and the other users and/or AI agents via voice commands.

17 Claims, 10 Drawing Sheets

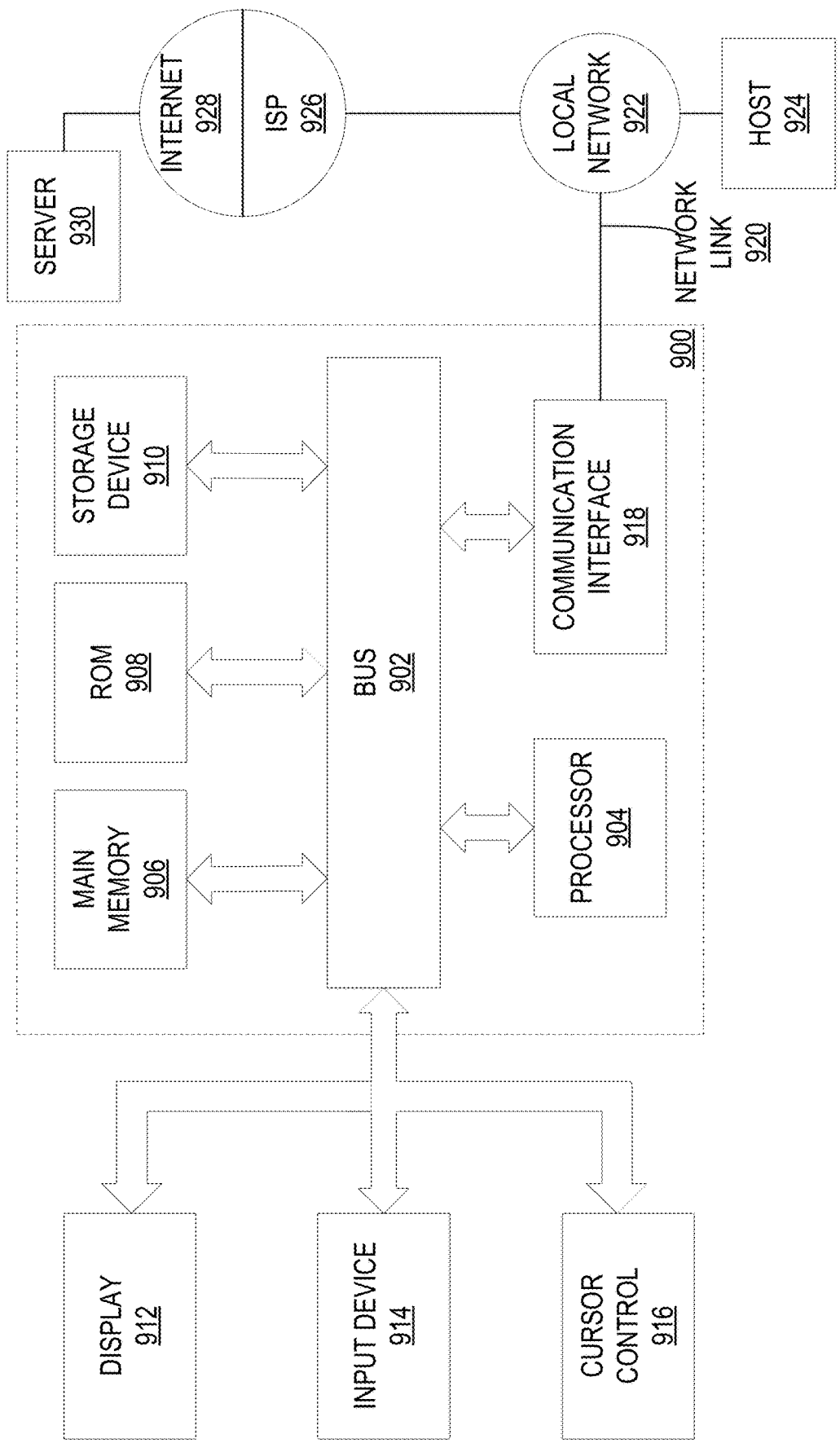

ADVANCED COMMUNICATIONS SYSTEM

CROSS-REFERENCE TO RELATED APPLICATIONS

This application claims benefit under 35 U.S.C. § 120 as a Continuation of U.S. patent application Ser. No. 18/786,512, filed on Jul. 28, 2024, which claims benefit under 35 U.S.C. § 119(e) to U.S. Provisional Application No. 63/529,635 filed Jul. 28, 2023. The entire contents of each of these applications are hereby incorporated by reference as if fully set forth herein. Applicant hereby rescinds any disclaimer of claim scope in the parent applications or the prosecution history thereof and advise the USPTO that the claims in this application may be broader than any claim in the parent applications.

TECHNICAL FIELD

Embodiments relate generally to improving the performance of communication systems, and, more specifically, to improving the performance of voice communication systems.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As of 2023, the trend toward remote work has gained significant momentum, with more and more companies adopting this model to attract and retain talent. However, as companies have transitioned to remote work, they have faced challenges in maintaining productivity and team cohesion. In many cases, employees have struggled with distractions, communication barriers and lack of access to necessary resources.

Despite these challenges, the shift to remote work has become a necessary step for many companies to remain competitive in the modern job market. With employees seeking greater work life balance and flexibility, companies must adapt to meet these demands. Investing in remote work solutions can help companies to streamline their operations and enable their employees to work more efficiently from any location, freeing substantial cash flow.

One significant advantage of remote work is a reduction in overhead costs associated with maintaining a physical office space. Without the need for large office buildings or on-site equipment, companies can reallocate funds toward technology and infrastructure that support remote work.

The shift toward remote work reflects broader changes in the way people work and live. As companies continue to prioritize employee well-being and productivity, it is likely that there will be even more investment in remote work solutions and the development of new technologies to support this trend.

While remote work offers many benefits, one of the most significant challenges is communication inefficiencies. Without face-to-face interactions, employees may struggle to convey complex ideas, collaborate on projects, or build relationships with their colleagues. As a result, companies have been forced to seek out and invest in solutions that can help mitigate these challenges and improve the overall efficiency of remote work.

One of the most common solutions is the use of video conferencing technology which allows employees to communicate and collaborate in real time, regardless of their location. Video conferencing can help to recreate the experience of in person meetings and allows employees to read each other's body language and facial expressions, which can enhance communication and build rapport.

Other solutions include instant messaging platforms and collaboration software, which can help employees stay connected and work together on projects in real time. These tools can also be used to share files and data, create project timelines and assign tasks, streamlining work processes and reducing the potential for miscommunication.

BRIEF DESCRIPTION OF DRAWINGS

The present invention is illustrated by way of example, and not by way of limitation, in the figures of the accompanying drawings and in which like reference numerals refer to similar elements and in which:

FIG. 9 is block diagram of a computer system upon which embodiments of the invention may be implemented.

DETAILED DESCRIPTION OF THE INVENTION

Figure 1A:
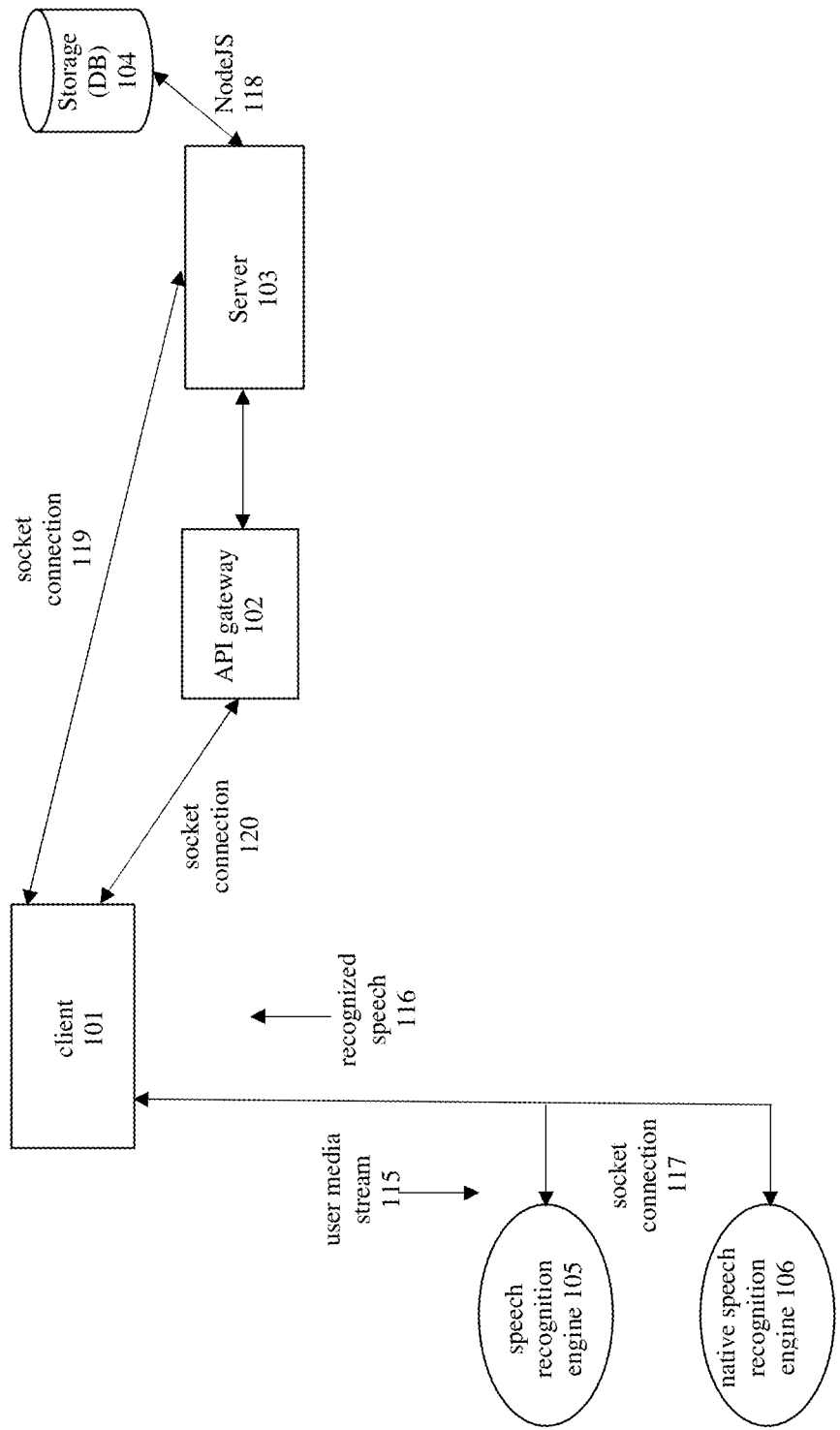
FIGS. 1A and 1B are block diagrams of data flow and components of a communications system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. System Architecture
2.1. Example Features
2.2. Example Application Scenarios
3.0. Implementation Mechanism-Hardware Overview
4.0. Extensions and Alternatives

1.0. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format and should be understood as merely a conceptual prelude to a more detailed description of example possible embodiments that follows below.

There has been a growing need for effective communication solutions that can make remote teams feel like they are a cohesive group in a common location. However, existing solutions often lack the seamlessness of being in the same room, resulting in communication issues that hinder productivity. Using video conferencing tools often feels cumbersome and unnatural. In some instances, companies that went fully remote after the Covid pandemic have even decided to go back to the office, at least partly, after realizing that in-person communication is a preferable condition to increase work performance and foster the generation of new ideas. Difficulty with conference rooms, link requests, and waiting for others to leave conference rooms often result in a significant lack of efficiency and cohesiveness of a team.

The current expectation is a work environment where a certain degree of flexibility is guaranteed. Companies have discovered that operating overhead is drastically reduced with a smaller real estate footprint required by transitioning to a fully remote work or hybrid model. These companies are investing part of the money saved toward implementing technology and solutions that enhance team communication and collaboration.

An embodiment provides the answer to this growing demand by implementing a communications solution that significantly increases the productivity of remote teams by increasing the ease of accessibility between team members. The system ties together speech recognition AI, VoIP, and wireless earbuds, to provide remote working teams the closest experience possible to working in the same room, regardless of where they are. The system allows team members to simply say, "hey, [name of coworker]", to open a direct line of VoIP communication with the coworker. Either participant can speak a voice command such as "bye-bye", to close the communication. The system enables seamless and efficient communication between team members, while preserving the privacy of team members when communication is not needed.

In an embodiment, specialized wireless earbuds, that provide a comfortable fit for extended periods of wear, allow team members to focus on their work without distraction for the whole day and without having to feel the need to remove the earbuds after a few hours.

The system addresses the challenges of remote work and helps increase productivity by making remote teams feel as if they are in the same location. The system implements innovative features and a user-friendly interface that revolutionize the way remote teams communicate and collaborate.

The system utilizes voice commands to activate communication lines between users, allowing for immediate and seamless conversations. The software can be a web app, a computer program, a smartphone app, etc. The specialized features of the hardware headset make the system effectively seamless. In an embodiment, the software can adapt to any headset to enable the key features.

In addition to facilitating seamless communication between remote workers, the system can also boost the performance of teams working within the same office, but in different areas. Moreover, teams in large stores, conference halls, hotels, military bases, hotel hospitals, etc., and private citizens who currently rely on traditional communication methods such as phones or walkie-talkies can greatly benefit from the system.

In an embodiment, users create an account and create their list of friends on the system via an app or online. During normal operation, their device microphones actively listen to all sounds, waiting to detect commands from the monitored audio. In an embodiment, if privacy reasons are a concern, none of the audio is saved, archived, or accessible by the system.

2.0. System Architecture

Referring to FIG. 1A, an example block diagram illustrating data flows and components of the system is shown. In an embodiment, a user using client 101 begins the login process onto the server 103 using application programming interface (API) gateway 102 via web socket 120. The API gateway 102 gives the client software access to available services on the server 103. Client device 101 sets up a communications channel between itself and the server 103 in order to engage a login process at server 103. The user enters their authorization details in the user interface on the client software to sign up or log in via a user interface from the login process at server 103. If the user is authenticated by server 103, then the client 101 can fulfill its requests to the server 103 via the API gateway 102. Database 104 is used by server 103 to store all user data and to verify the identity of the user.

Note that client 101, speech recognition engine 105, native speech recognition engine 106, API gateway 102, and server 103 can communicate between each other using socket connections, e.g., 114, 117, 119, 120, across the cloud for quick response and updating of user statuses and messages. This can occur when a user enters the site, logs out, adds or deletes a contact/friend, etc.

The user can utter voice commands for hands-free operations via client 101 which can be detected by a microphone, headset, earbuds, etc. Note that client device 101 can be any consumer electronic "smart" device, e.g., cellular phone, tablet, smart watch, laptop, PC, desktop computer, smart headset, etc. Client 101 digitizes and records the voice utterances and prepares voice stream packets 115 to be sent to one or more speech recognition engines. Captured audio is preprocessed to remove noise, filter out non-speech sounds, and enhance the speech signal.

In this example, client 101 sends voice stream packets 115 to one or both of speech recognition engine 105 and/or native speech recognition engine 106. Speech recognition engine 105 operates in many different browsers while native speech recognition engine 106 operates stably with Safari and Chrome browsers.

In an embodiment, the preprocessed audio is analyzed using a speech recognition algorithm which converts the spoken words into text. This typically involves breaking the audio stream into discrete chunks, analyzing the spectral and temporal features of each chunk and matching these features to a set of predefined engine-side speech models or language models. Once the speech has been converted to text, resulting text is compared with the list of voice commands. The comparison may be performed by a text recognition engine, AI engine, etc. For example, for an English version, the voice commands can include, "hey [name]" (where "name" is a name of a friend, for example, so a user can have a large number of "hey [name" commands), "I'm busy", "bye-bye", etc. In an embodiment, when adding a friend, a user can be prompted to repeat their specific command multiple times in different tones as they train the machine learning algorithm to recognize the user's voice and accent, whether online or offline.

In an embodiment, a combination of on-device processing and pre-downloaded data can be used. With built in natural language processing and machine learning algorithms, the system can interpret voice commands and perform certain tasks without relying on a network connection. In an offline on-device speech recognition system, the system can be trained on a large data set of audio recordings and corresponding transcripts. This training data is used to develop a machine learning model that can recognize speech and new audio recordings. Using the training data, the speech recognition system can develop a machine learning model that is optimized for offline on-device speech recognition. This model is typically a deep neural network that can be executed locally on the device. Once the machine learning model is trained, it can be deployed onto the device. This typically involves optimizing the model for performance on the device's hardware and any memory constraints. With the model deployed on the device, the user can speak into the device's microphone and the speech recognition system can analyze the audio signal in real time to recognize spoken words. The system typically segments the audio signal into smaller time frames and uses the neural network to predict the likelihood of each possible word or phrase in each time frame. Once the speech has been recognized, the system can generate an output, such as a text transcription of the speech or command to perform a specific action on the device. This output can be delivered to the user via user interface such as a screen display, speech synthesis, or other means.

After recognizing the command phrase, the recognized command 116 is sent to client 101. Client 101 sends the recognized command via API gateway 102 to the server 103. Server 103 can make a call to the backend depending on the recognized voice command, such as activate a connection, reject, leave a conversation, etc.

Figure 1B:
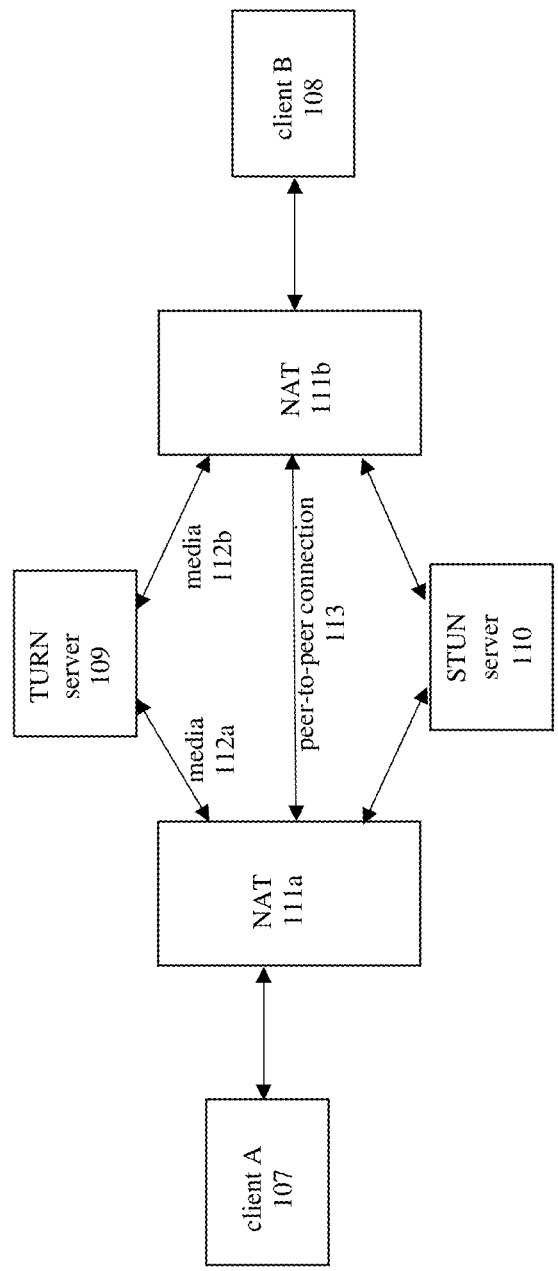

Referring to FIG. 1B, in an embodiment, user X at client A 107 utters a command such as, "hey [name]," that sets up a call between the user and another user, user Y at client B 108, in this example. Server 103 looks up user Y in database 104 to confirm that user Y is in user X's 107 contact/friend list. This can be by either direct text match, phonetic match, etc. If server 103 finds that more than one friend in the list matches the command text, server 103 performs a disambiguation protocol that may include selecting the phonetically closest match or prompting the user for more specific information by sending a query to client A 107. If no friend is found in the list that matches the command, then an error message is sent to client A 107.

In an embodiment, additionally or alternatively, a direct voice comparison may be performed by server 103. Server 103 may directly compare voice samples from the user's friend list with the voice sample from a parsed command received from client A 107. The friend list can be populated with multiple voice samples of the user reciting each friend's name. If no friend is found in the list that matches the parsed command, then an error message is sent to client A 107.

When user Y is found in the friend list, server 103 attempts to locate user Y at client B 108 using VoIP or other communication mechanism. Server 103 contacts user Y and notifies user Y via audio that user X is attempting to contact him. When user Y at client B 108 accepts, an answer is returned from client B 108 and an audio room is created by server 103. Note that, as discussed in this example, user Y exists and is online. In order to be able to talk in the audio room, it is necessary to create a peer-to-peer connection 113 between client A 107 and client B 108. Client A 107 sends a signal to client B 108 indicating that client A 107 wants to connect with the client B 108 for a conversation. In response, the client B 108 sends a response to client A 107. The STUN (Session Traversal of User Datagram Protocol (UDP) Through Network Address Translators (NATs)) server 110 tests the network connection between client A 107 and client B 108. If no internal network settings in NAT 111a and 111b block this connection, then a peer-to-peer connection 113 is established between client A 107 and client B 108. In this example, no intermediate servers are used. If there are any settings in NAT 111a and 111b that block peer-to-peer connection between client A 107 and client B 108, the TURN (Traversal Using Relays around NAT) server 109 is used to transmit sound media 112a, 112b, between client A 107 and client B 108.

VoIP

In an embodiment, when the system uses VoIP APIs, the client makes a call to a server to get a token for VoIP APIs. The system initializes a session with the VoIP API. This involves setting up a connection to the API server and configuring various parameters such as audio codecs, session protocols, and call routing rules. The system uses the VoIP API to handle incoming and outgoing calls. The API provides various methods for making and receiving calls, as well as for managing call states. During the call, the VoIP API manages the streaming of audio data between the endpoints. This involves encoding and decoding the media streams using various audio and video codecs, as well as managing network congestion and quality of service (QoS) issues. Once the call is complete, the VoIP API terminates the session and releases any resources that were used during the call. This may involve closing the network connections, deallocating memory, and releasing any locks or other synchronization mechanisms used by the API.

In a peer-to-peer decentralized VoIP, the VoIP system communicates between two end points that are established without relying on a centralized server. Each endpoint in the network acts as both a client and a server, allowing communications to take place directly between them. When an endpoint wants to make a call to another endpoint, it first needs to discover the other endpoint's IP address. This can be done using various techniques such as multicast DNS (mDNS), peer discovery protocols, or distributed hash tables (DHT). Once the IP address of the remote endpoint is discovered, the initiating endpoint can establish a direct connection with the remote endpoint using a peer-to-peer protocol such as the Session Initiation Protocol (SIP) or the Realtime Transport Protocol (RTP). With the connection established, the two endpoints can exchange audio data directly without the need for a centralized server. The media streams are typically encoded using audio and video codecs such as Opus or H.264 and are transmitted using a real time transport protocol such as RTP. Since P2P VoIP systems do not rely on a centralized server to facilitate communication, they are less vulnerable to server-based attacks. To further mitigate risks, P2P VoIP systems typically use various security measures such as encryption, digital signatures, and peer authentication. P2P decentralized VoIP systems offer a more distributed and resilient approach to VoIP communication with potentially much lower latency and higher privacy compared to traditional server-based VoIP systems.

A combination of offline on device speech recognition and peer-to-peer decentralized VoIP can result in: 1) a drastically lower latency between the beginning of the command and the start of the communication, 2) increased privacy, and 3) higher quality of VoIP communication between users.

2.1. Example Features

Creating a Friends List

Figure 2:
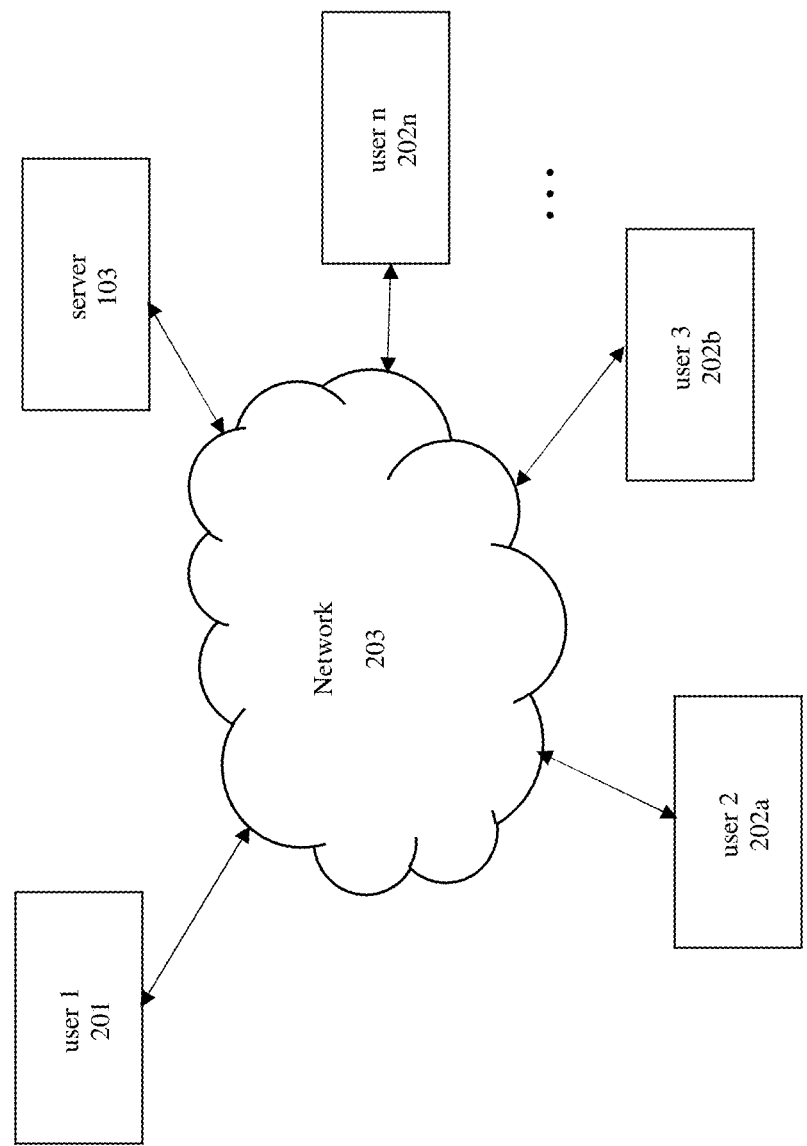
FIG. 2 is a block diagram of a user and friends in a networked environment, according to an embodiment.

Referring to FIG. 2, a user 201 can create a list of friends 202a-202n by adding friends in a user interface. The user can enter the friends into the friend list via text entry or, when voice matching is implemented by server 103, record an audio pronunciation of each friend in the list. The list of friends can be edited by the user by adding or deleting friends. Friends typically must exist in the user's list in order for the server 103 to recognize commands directed at other users.

Figure 4:
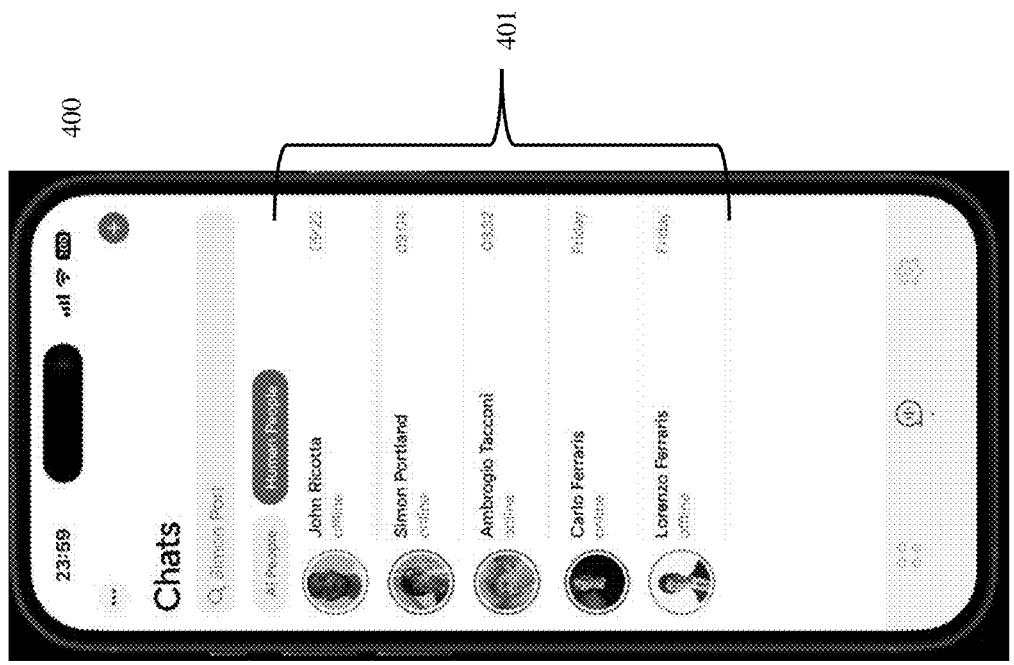
FIG. 4 is an example user interface of a contact list of friends, according to an embodiment.
Figure 5:
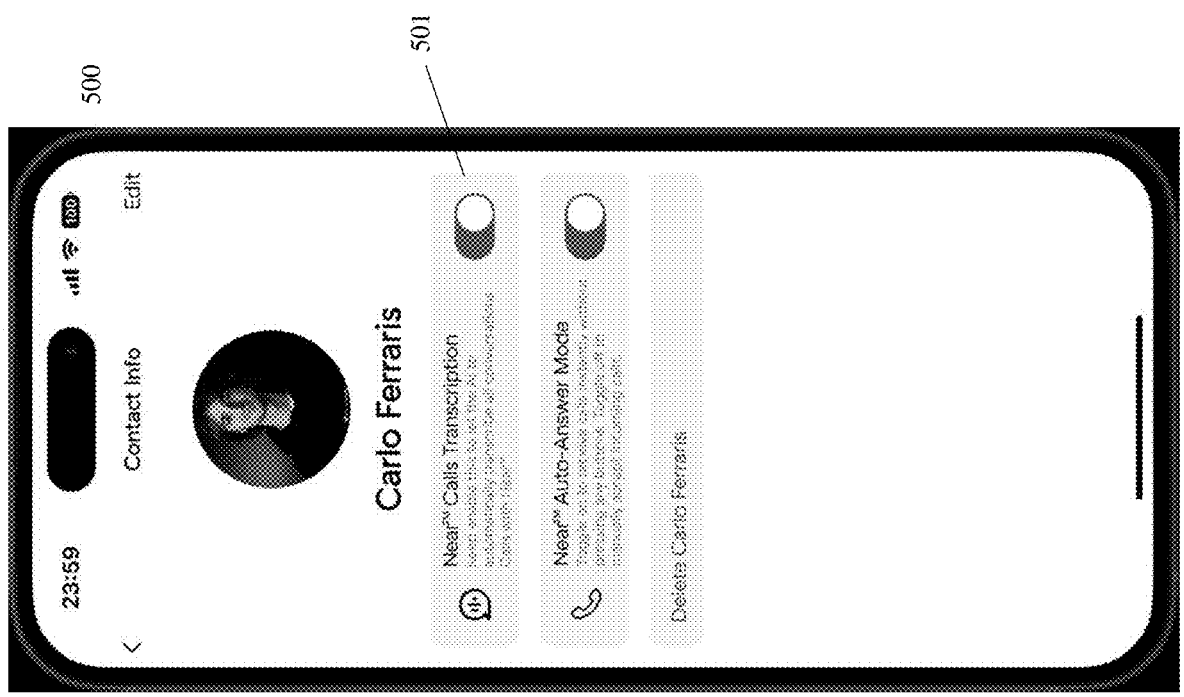
FIG. 5 is an example user interface of settings for a contact, according to an embodiment.

Referring to FIGS. 4 and 5, a user interface screen 400 is shown where a user can add friends to a contacts/friends list 401 and select prior chats to view. The user can set preferences for each friend 500. For example, the user can have all of the verbal conversations with a friend transcribed and saved 501. This allows the user to review prior chats with the friend.

Starting a Conversation Between Friends

User 1 201 can set up a command for each of their friends, such as "hey user 2", "hey user 3", etc. The speech recognition component of the system recognizes the command and the system establishes the voice communication line as discussed above, for example between user 1 201 and user 2 202a, and signals the start of the conversation to both users with an audio signal. User 2 202a can also hear "hey user 2", in the voice of user 1 201 before hearing what user 1 201 has to say.

Rejecting a Conversation

In some instances, the receiving user may be in meetings or busy for other reasons. If user 2 hears a signal but is busy, they can say "I'm busy", to turn off the communication right away.

Leaving a Conversation

If user 2 doesn't say "I'm busy" within the first few seconds, the communication line will stay open until either user 1 or user 2 says the command "bye-bye", for example. In this case, the system closes the communication connection and signals the end to both users with an audio signal.

If more than two people are in the communication, the user who says "bye-bye" leaves the communication and the remaining users hear a sound signaling them that someone has left.

Group Conversation

An embodiment allows for group communications, enabling users to speak with multiple team members at once. User 3 202b can join the communication between user 2 202a and user 1 201 either by saying "hey user 2" or "hey user 1". User 2 202a and user 1 201 can hear a sound signaling that a new user has joined the call. User 2 202a and user 1 201 may also hear "hey user 2" or "hey user 1" in the voice of user 3 202b before hearing what user 3 has to say, enabling the user 2 202a and user 1 201 to be aware of who user 3 202b wants to talk to.

In an embodiment, either user 2 202a or user 1 201 can also add user 3 202b to the conversation by saying "hey user 3" during the active conversation between user 2 202a and user 1 201. The users that are active in the call can continue to expand with multiple users.

Users can also set permissions so that a conversation cannot be joined by third parties.

Conversations with the Team

Users can be grouped into teams through the system interface. Friends are grouped into specific team identifiers in order to cause server 103 to create a multi-user call. For example, if user 1 201, user 2 202a and user 3 202b belong to team 1, a conversation with all three users can be started by saying "hey team 1". Teams can reflect the structure of a company. Users with admin permissions can activate communications to one team, multiple teams, or the whole organic, making it easier for managers to make announcements or disseminate important information to their team members. Such conversations can be one way or two way.

Starting a Conversation without Voice Commands

While users can manually activate a call by clicking on a friend's or a team's name from within the user interface (via an app or API interface), the system is geared toward enabling communication through voice commands. This eliminates the need for manual calls or messages, making communication more natural and effortless.

Knowing the Availability of Friends

In order to enable users to know the availability of their friends, the system utilizes an online status indicator and a running process indicator. When a user logs into the app or user interface, their status will show as online, denoted, for example, by a green circle around their profile picture. This indicates that they are available to receive communications.

If the user is logged into the app or user interface but hasn't interacted with their device in last five minutes (e.g., determined by mouse tracking, keyboard activity, etc.), their status will change to IDLE, denoted, for example, by a yellow dot around their profile picture. This indicates that they are still online but may be away from their computer.

If a user is not logged into the app or user interface, their status will show as offline, denoted, for example, by a gray dot around their profile picture. This indicates that they are not available to receive communications at that time. If a user tries to reach an offline friend with a voice command, they hear a sound signaling that the friend is not available.

Server 103 can display online status indicators to user client systems via a user interface or on an app where users can easily determine the availability of their friends and initiate conversations when their friends are available and online. This not only helps to prevent missed communications, but also ensures that users are not interrupted when they are not available to communicate.

A running process indicator displayed on the user interface can also show the program a friend is currently running on their computer next to their username, depending on the privacy permission setup.

Headset.

Utilizing a headset makes knowing the availability of friends exponentially more accurate. A headset can be used to drastically improve the system's performance and user experience. Such a headset can be earbuds, headphones, bone conduction headphones, IEMs, etc. For the best experience, users may have to wear the headset for an extended period of time, such as the eight working hours.

Figure 3:
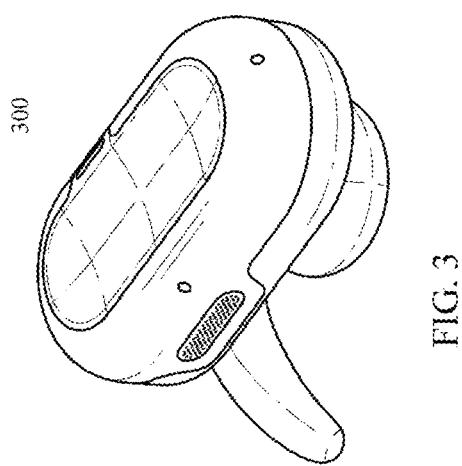
FIG. 3 is a diagram of an enhanced earbud, according to an embodiment.

Referring to FIG. 3, comfort is especially important. Two examples of such headsets are open acoustic earbuds 300 that use a gravity hook that, by hooking to the Concha part of the ear, make the headset easy to wear for an extended amount of time, and bone conduction headphones. Both these solutions leave the air canal free, so users can easily hear outside conversation even while wearing them.

Headset in Speech Recognition

Using the system's specialized headset can significantly improve the precision of speech recognition and the quality of VoIP calls.

Speech recognition technology relies on accurate audio input to function correctly. When using a headset, the microphone is placed closer to the user's mouth, reducing background noise and improving clarity of the user's voice. This makes it easier for the speech recognition software to pick up on the user's commands and reduce the chance of errors or misinterpretations.

Headset in VoIP

In addition to improving speech recognition accuracy, using a headset can also improve the quality of VoIP calls. When making a VoIP call, the audio is transmitted over the Internet and can be affected by various factors such as network speed, packet loss and jitter. Using a headset with a built-in microphone can help to reduce background noise and echo, making the audio clearer and easier to understand.

Furthermore, a headset can provide a more comfortable and convenient communication experience for users. By using a headset, users can communicate hands-free, freeing up their hands to multitask or take notes during the call. Headsets can also provide better privacy, reducing the risk of others overhearing the conversation.

Headset and Availability

A headset with built in ear detection can guarantee that a user hears a communication from another user, essentially giving certainty of availability to other users.

In-ear detection technology utilizes sensors that detect when the earbuds 300 or headphones are placed in the user's ears. When the headset is worn, the in-ear detection technology can automatically activate or deactivate the communication software depending on the user's availability.

For example, when a user puts on their headset, the in-ear detection technology can activate the communication software and change the user's status to online. This indicates to other users that the user is now available to receive calls and messages.

Conversely, when the user removes their headset, the in-ear detection technology can automatically deactivate the communication software and change the user status to idle or offline. This ensures that other users know that the user is not currently available to receive calls or messages.

Using a headset with built-in ear detection can provide a more reliable way for users to indicate their availability to others. This is because the in-ear detection technology can virtually guarantee that the user is wearing the headset and therefore actively available to receive calls and messages.

Headset Signaling Light

Adding an LED positioned on the outside of the headset can provide a useful visual indicator to those around the receiving user that they are in a conversation with someone else, or that a conversation has just been initiated. When the user receives a communication from another user, the LED light will turn on indicating that they are currently unavailable to talk to other people physically around them. This would allow those around the user to know not to disturb them when they are on a call.

Artificial Intelligence (AI) Integration

Figure 6:
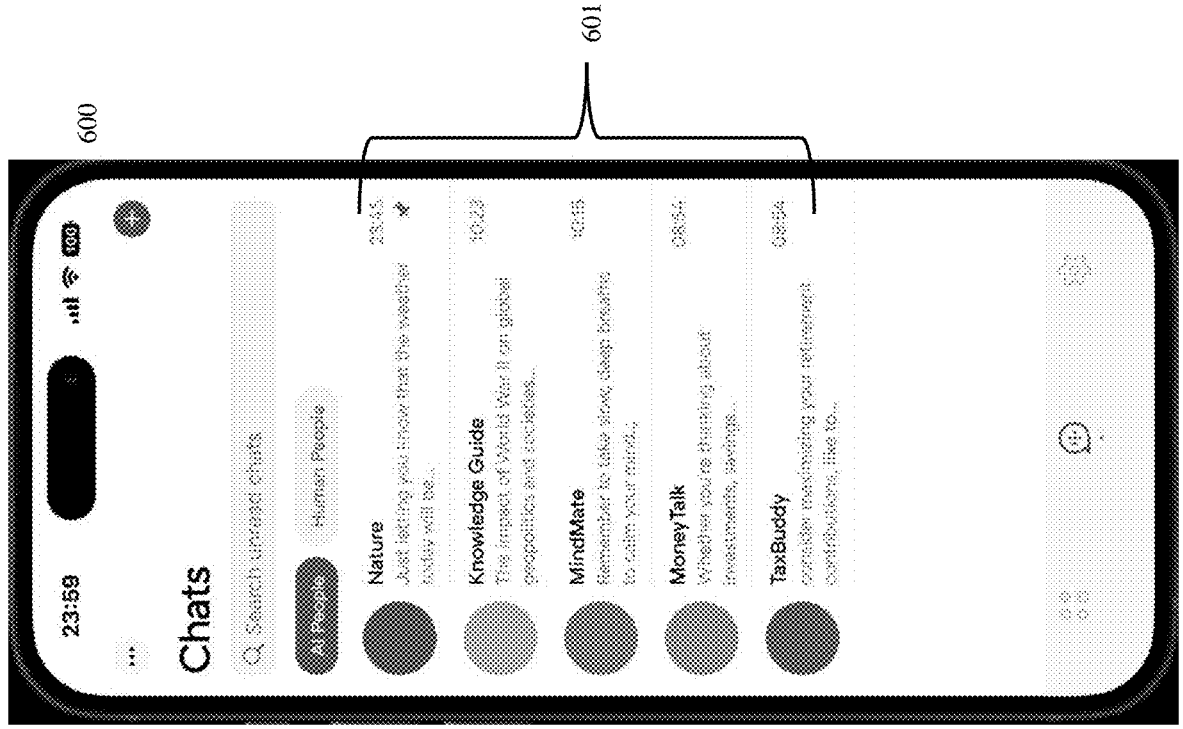
FIG. 6 is an example user interface of a contact list of artificial intelligence (AI) agents, according to an embodiment.
Figure 7:
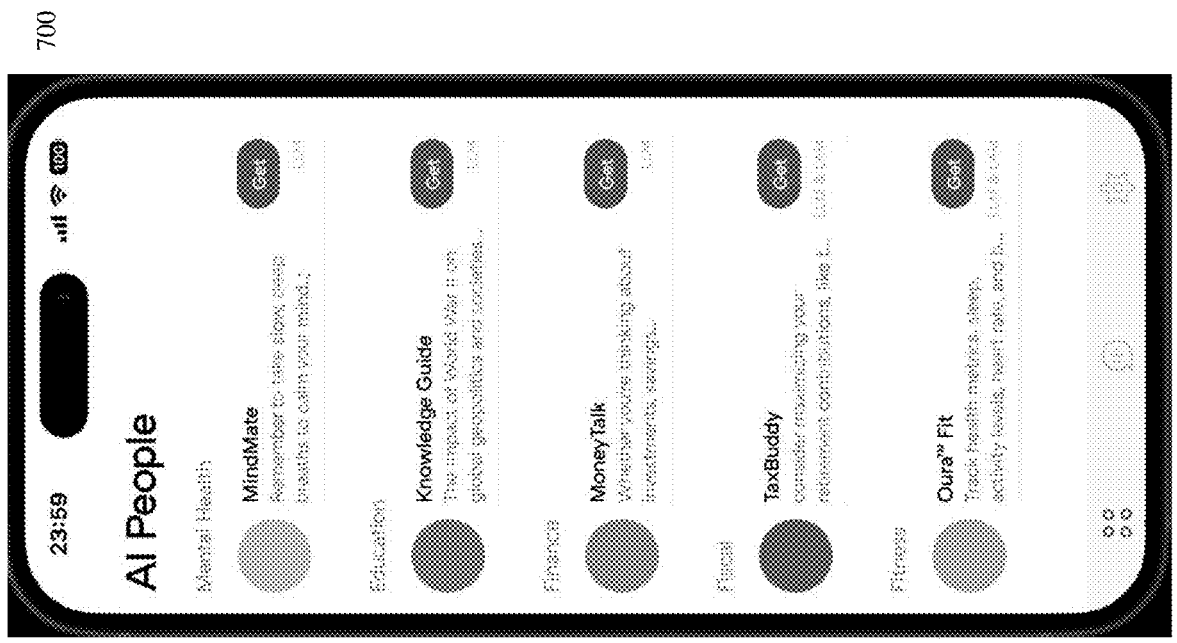
FIG. 7 is an example user interface of available AI agents, according to an embodiment.

With emerging AI models, specialized AI agents have and are being developed that specialize in a certain field or area, e.g., investing, behavioral wellness, general knowledge, medical, taxes, etc. Referring to FIGS. 6 and 7, as with the adding friends scenario, a user interface screen 600 is shown where a user can add AI agents to his friends and agents (contacts) list 601 and select prior chats to view. In an embodiment, a user interface screen 700 is shown where a user can select AI agents to add to the list 601. The user interface screen 700 explains the area of expertise that the AI agent provides. A user can select specific AI agents for the system to install references to and direct conversations to the installed AI agents. A user can create his own AI agent and install it into the system. In an embodiment, a general AI agent/assistant can act as a central operator or switch board to interpret, answer, and/or direct user statements and queries to friends or installed AI agents. Once a voice communication from the user has been converted to text using the speech recognition system, the AI assistant (in this example, Nature) is sent the textual content and evaluates the content. The AI assistant can reply to the user directly or suggest another AI agent to the user. The communications between the AI assistant and the user as well as any other AI agent and the user are transcribed and stored (if configured to do so). Responses from the AI assistant or AI agent are sent through a text to speech system and the speech result is sent to the user through the communications session.

AI Assistant

Integrating a default voice AI agent/assistant, in this example, Nature, (which can be similar to a more well-known ChatGPT system) into the communications software can provide a number of benefits to users. By enabling the users to access the world's knowledge in a conversational manner, users can easily find information or get answers to their questions without needing to leave the communication platform.

To use the AI assistant the user can assign a name to it and then use the "hey name" voice command in the exact same way as to start a conversation with a friend, for example in this case, "hey Nature". An audio communications session is then started between the user and the AI assistant much like starting a communications session with a user's friend/contact. The AI assistant could then utilize natural language processing and machine learning to understand the user's question and provide an appropriate response. This could include providing information from the Internet, answering trivia questions, providing recommendations for restaurants or movies, directing the user to other AI agents, etc. The AI assistant can pass the user to an installed AI agent by creating a communications session with the AI agent when the AI assistant has evaluated the user's communications and finds that the communications can be addressed by the AI agent's area of expertise. The AI agent then communicates with the user until the user terminates the session. At session termination, the user can then be switched back to the previous level session with the AI assistant.

By integrating an AI assistant into the communication software, users can save time and effort by not needing to switch between different applications or search for information manually. This can help to streamline the communication experience and improve productivity.

Furthermore, the AI assistant can also provide a more personalized and interactive experience for users. By utilizing natural language processing and machine learning, the AI assistant can adapt to the user's preferences and provide more accurate and relevant responses over time. This can help to build trust and familiarity between the user and the AI assistant, creating a more natural and conversational experience.

Here are some example scenarios illustrating how an AI assistant integrated into the system can be useful for personal and professional use, whether a conversation with someone else is active or not:

1. The user is cooking dinner and needs to convert a measurement but does not want to stop what they are doing to look it up. They can simply say "hey Nature, how many cups are in a liter?" and receive an immediate response.
2. The user is watching a movie and wants to know the name of the actor on the screen but does not want to pause the movie and look it up. They can say "hey Nature, who is the actor playing the main character in this movie?" and receive an immediate response.
3. The user is reading an article and wants to know more about a topic mentioned in the article. The user can say, "hey Nature, can you tell more me more about this topic?" and receive an immediate response with additional information.
4. The user is getting ready for work and wants to know the weather forecast for the day but doesn't want to stop what they are doing to check their phone. They can say, "hey Nature, what's the weather forecast for today?" and receive an immediate response with the information they need.
5. The user is driving and needs to find the nearest gas station but can't safely pull out their phone. The user can say "hey Nature, where is the nearest gas station?" and receive an immediate response with directions to the closest station.
6. The user is grocery shopping and wants to know if a certain item contains gluten but doesn't want to stop and check their phone. They can say, "hey Nature, do bananas contain gluten?" and receive an immediate response with the needed information.
7. The user is exercising and wants to track their progress but doesn't want to stop their workout to check their phone. They can say, "hey Nature, how many steps have I taken today?" and receive an immediate response with their current step count.
8. A user is on a call with colleague and needs to quickly look up a piece of information. Instead of switching to another application or searching the Internet manually, the user can simply say, "hey Nature, what are the dates of the Consumer Electronics Show in 2024?" The AI assistant would then provide an immediate response, allowing the user to continue with their call without interruption.
9. A user is on a call with a group of colleagues and needs to schedule a meeting. Instead of switching to a separate scheduling application or manually coordinating with everybody, the user can say, "hey Nature, can you schedule a meeting for us next Tuesday at 10:00 AM?" The AI assistant would then coordinate with the group and send out meeting invitations, saving the user time and effort.

In this scenario, where users are wearing the headset for their whole waking day, they can easily access human knowledge in a conversational manner without the need to interact with the physical device, essentially extending their knowledge in a seamless way.

Mental Health AI Agent

Figure 8:
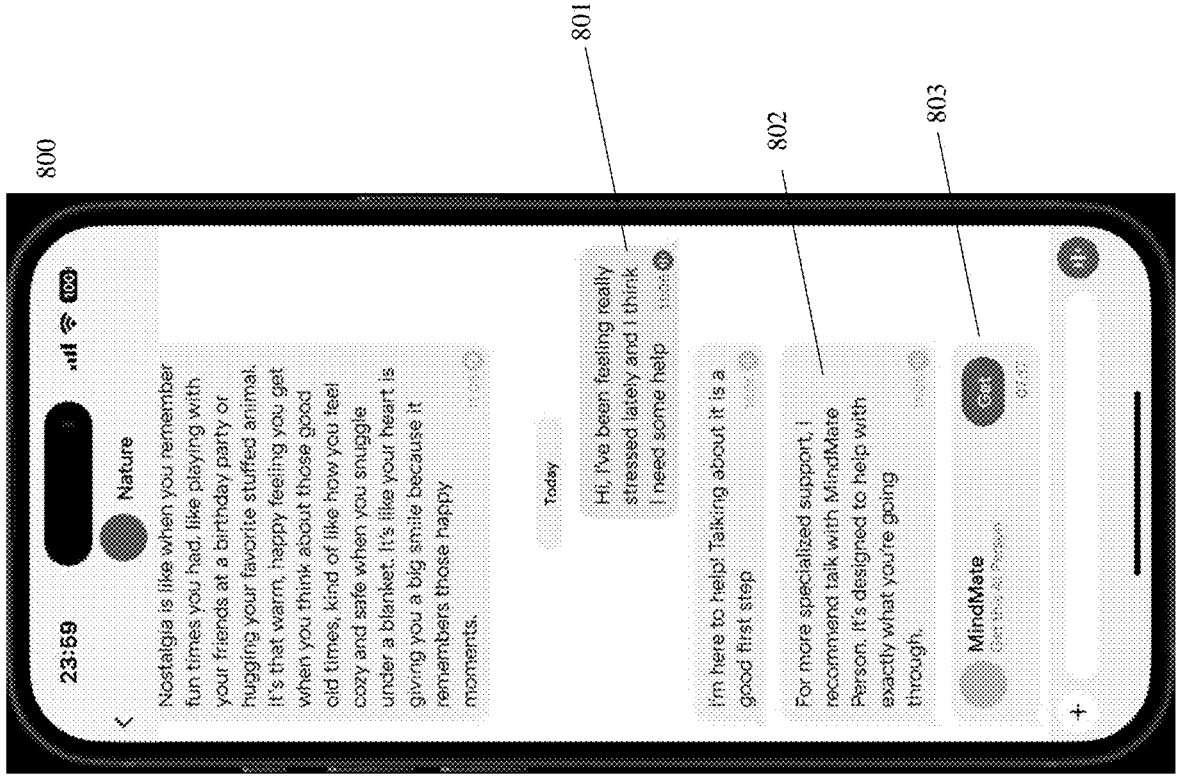
FIG. 8 is an example user interface of a transcript of a conversation between a user and an AI agent, according to an embodiment.

Referring to FIG. 8, a transcribed chat session with an AI assistant is shown where, as the user communicates with the AI assistant, the AI assistant evaluates the user's communications 801, determine the area of expertise needed to address the user's comments and can refer the user to another AI agent 802 if it does not have the ability to respond with authority. If the user has not installed the suggested AI agent, the AI assistant can direct the user to an AI agent resource 803. During the actual conversation, the user can have the option to verbally request the installation of the AI agent into his AI agent list. Once the AI agent is installed, the AI assistant can instantiate a communications session between the user and the AI agent and hand the user off to the AI agent. In this example, the user is then put into communication with the MindMate AI agent. The user can then interact with the agent.

Relationship AI Agent

The system can be integrated with a relationship AI agent such as Replika or similar. Such features could be valuable for users looking to engage in meaningful conversations or build relationships with an AI agent. Replika is designed to learn and understand a user's personality and interests over time, allowing for more personalized and engaged conversations. Users can interact with their Replika AI by using the voice command, "hey Replika" and initiate a conversation on any topic.

The benefits of having a Replika inside the system are numerous. For example, users who are shy or introverted may find it easier to engage in social interactions with an AI that is programmed to understand and support them. Additionally, users who are experiencing feelings of loneliness or isolation may benefit from having a virtual companion to talk to and share their thoughts and feelings with. The Replika AI can also be used as a tool for self-reflection and personal growth, helping users gain insights into their emotions, behaviors and thought patterns.

Similar to the movie Her, where the protagonist falls in love with an AI assistant, users of the system could also form close relationships with their Replika AI. This could be particularly valuable for users who have difficulty forming meaningful relationships in their real life due to various reasons such as social anxiety or lack of social skills.

Overall, setting up a relationship of AI inside the system can provide users with a unique and valuable feature that allows them to engage in personalized and meaningful conversations with an AI companion. The Replika AI has already shown success in helping users improve their mental well-being and could be an essential tool for promoting positive interactions and relationships in the virtual world.

Speaker Pod

A speaker pod can be a useful addition in a situation where a team is working from an office, but one or more team members are working remotely from home. When team members are working remotely, it can be difficult for them to communicate effectively with their team members who are working in the same office. This can lead to misunderstandings, miscommunications and a breakdown in collaboration.

By using a speaker pod, remote team members can connect directly to the pod and speak to all members who are sitting in the same room. This allows for a more seamless and effective communication as remote team members can hear everything that is being said in the room and respond accordingly. The team in the office can also hear the remote team member's voice clearly without having to strain to hear the remote team member through a phone or computer speaker.

The speaker pod can also help to create a more inclusive environment for remote team members, as they can feel more connected to the team and be included in discussions that may otherwise be difficult for them to participate in. This can lead to greater engagement, collaboration and productivity among the team as a whole.

Overall, a speaker pod can be a valuable tool for improving communication and collaboration between remote team members and their colleagues who are working in the same office. It can help to create a more seamless and effective communication environment, promote inclusivity and enhance overall team performance.

The benefits of a speaker pod and promoting effective communication and collaboration between remote team members and their colleagues who are working in the same office can also be applied to different teams within the same building. By using a speaker pod, teams in different parts of the building can communicate and collaborate more effectively, improving overall productivity and teamwork. This can be particularly valuable in larger buildings where it may be difficult for teams to communicate and coordinate effectively without a dedicated communication tool. In this way, a speaker pod can be a useful addition to any workspace, facilitating more seamless and effective communication across teams and locations.

Independent Headset

A more advanced headset may be independent from other devices such as smartphones and computers.

Having a headset completely independent from another device can provide a number of benefits to users. Having a built in 5G connection, the user can access the communication software without needing a separate device such as a desktop computer acting as an interim device. This can be particularly useful for users who want a more streamlined and portable communication solution, as they can use the headset without needing to carry around another device.

Referring again to FIG. 3, to use an enhanced earbud 300, the user would simply need to set up their friends and commands through their online account, which would be reflected in the earbuds 300 through the Internet. Once they are set up, the user can start a conversation with his friend by using the usual voice commands. The earbuds 300 can include a powerful CPU, voice processor, and memory, to enable the earbuds to be able to store and execute voice recognition and matching with a friends list stored locally. The enhanced earbuds 300 can also bypass server 103 and set up calls independently.

A headset of this kind may replace the use of a smartphone in situations where it is not convenient to bring one, such as while doing sports.

2.2. Example Application Scenarios

Remote Teams

Communication problems can be a significant challenge for remote teams. One of the primary difficulties with remote communication is that team members are often hard to reach for quick questions or impromptu discussions. When everyone is working in the same physical location, it's easy to pop over to someone's desk or catch them in the break room for a quick chat. But in a remote environment, team members may not be available when needed, which can lead to delays and frustrations.

Another issue is that video conference meetings can be time consuming and focused on a specific topic, which can be challenging for remote teams. While video conferencing tools like Zoom or Teams can be an excellent way to bring remote team members together, they can also be less effective than in person meetings for certain types of communication. For example, if a team member needs a quick answer to a question or wants to brainstorm ideas with the rest of the team, a Zoom meeting might not be the best option. These types of conversations are often more effective in a face-to-face setting, where team members can bounce ideas off of each other and work collaboratively.

Overall effective communication is essential for any team. But it is especially important for remote teams. Currently, to overcome the challenges of remote communication, teams must establish clear communication channels and protocols such as regular check-ins and using asynchronous communication tools like email or messaging apps for quick questions. This is often a time-consuming effort and still does not reach the optimal environment of an in-person setup.

The following are some examples of how the system can improve communications between members of remote working teams:

1. Natural communication. The system can provide a more natural communication experience than traditional instant messaging platforms like Slack or Teams. By allowing users to communicate as if they were in the same room, the system can reduce misunderstandings and facilitate more effective communication.
2. Real time collaboration. The system can provide real time, instant, collaboration that email and Slack cannot. By providing a seamless communication experience, the system can facilitate real time collaboration on projects and tasks, allowing teams to work more efficiently and effectively.
3. Reduced interruptions. The system can help reduce interruptions that can occur during instant messaging, email, and video calls. By allowing users to communicate in a natural and uninterrupted manner, the system can improve productivity and reduce distractions.

Separate Areas of the Same Office

When team members work in the same office but in different areas, communication problems can still arise. One of the primary difficulties is that team members may be physically separated by distance, which can make it challenging to reach them for quick questions or impromptu discussions.

For example. If one team member is working on the 5th floor of a building and another team member is working on the 10th floor, it may be difficult to physically get to each other's location quickly. This can lead to delays in communication and decision making, which can ultimately impact the productivity of the team.

The following are some examples of how the system can improve communications:

1. Sharing files. Worker 1 may need to share a specific file with worker 2 but does not want to walk on the floor where worker 2 is located. With the system worker 1 can use a voice command to call worker 2 and share the file in real time, allowing for efficient collaboration.
2. Quick questions worker 1 may have a quick question for worker 2 but does not want to interrupt their work by walking to the area. Using the system worker 1 can call worker 2 using a voice command and ask their question in a natural and uninterrupted manner.
3. Project collaboration. Workers 1 and 2 may be working on a project together, but are in different areas of the office. Using the system, they can communicate and collaborate in real time as if they were in the same room, reducing misunderstandings and improving productivity.
4. Meeting coordination Workers 1 and 2 may need to coordinate a meeting but are in different areas of the office. Using the system, they can communicate and coordinate the meeting in real time, reducing the need for back-and-forth emails or instant messages.

Large Store Clerks

For large store clerks, communication is an essential aspect of their job where customers often ask questions about products, services or store layout to the nearest clerk they see without knowing if that person has expertise in that specific area. Store clerks must frequently communicate with each other to answer customer queries effectively. This communication can be challenging, especially in a large store with a complex layout and many staff members.

One of the primary difficulties with communication in this context is that clerks may not know the specific area of expertise of their colleagues. For example, a customer may ask a question about electronics, but the nearest clerk may not have expertise in that area. In this case, the clerk must communicate with their colleagues to find someone who can help the customer effectively. This communication can take various forms, such as physically looking for a colleague, calling them on the phone, or using a walkie-talkie to try to reach them.

These methods of communication can be cumbersome and inefficient. Physically looking for a colleague may take time, especially if the store is large and can be distracting to the clerk's current tasks. Calls can go unanswered or be missed entirely if the colleague is busy. Using walkie talkies can be challenging as the store has a lot of background noise or if the colleagues are in different parts of the store.

The following are some examples of how the system can improve communications:
1. Price check requests. A clerk may need to request a price check on a specific item but does not want to leave their area or interrupt another clerk. Using the system, the clerk can use a voice command to call the clerk in charge of pricing and request a price check, allowing for efficient communication and collaboration.
2. Product availability inquiries. A clerk may need to check the availability of a specific product but does not want to leave their area or interrupt another clerk. Using the system, the clerk can use a voice command to call the clerk in charge of inventory and check the availability of the product in real time.
3. Customer inquiries. A clerk may receive a customer inquiry that they are unable to answer but does not want to leave their area or interrupt another clerk. Using the system, the clerk can use a voice command to call a colleague who can provide the necessary information to the customer, thereby improving customer service and satisfaction.

Warehouses

Similar difficulties are encountered on a daily basis by warehouse workers.

Communication is crucial for workers in warehouses as they must frequently coordinate with their colleagues to complete tasks efficiently and safely. Warehouses can be vast and complex, and workers may be spread out across different areas making communication challenging.

One of the primary difficulties with communication and warehouses is that workers may need to quickly and frequently communicate with each other to ensure that products are correctly picked, packed and shipped. For example, a worker may need to ask a colleague for assistance in locating a specific product, checking the inventory levels of a particular item or clarifying a product storage location.

The following are some examples of how the system can improve communications:
1. Inventory management. Warehouse workers may need to communicate with each other to manage inventory, such as requesting a stock transfer or checking stock levels. Using the system, they can use a voice command to call each other and communicate in real time, thereby reducing the need for physical movement and improving inventory management efficiency.
2. Order fulfillment. Warehouse workers may need to communicate with each other to fulfill orders, such as requesting a specific item or coordinating the packing and shipping process. Using the system, they can use a voice command to call each other and communicate in real time, improving order fulfillment efficiency and accuracy.
3. Shift coordination. Warehouse workers may need to communicate with each other to coordinate shift changes, such as requesting coverage for break or coordinating shift handovers. Using the system, they can use a voice command to call each other and communicate in real time, reducing the need for physical movement and improving shift coordination efficiency.

Conference Halls

For people who work in conference halls, communication is also crucial to ensure smooth and efficient operations. Conference halls are often large facilities with multiple rooms and a diverse range of events and attendees. Staff members must communicate frequently to coordinate events setups, manage attendee needs and troubleshoot any issues that arise.

One of the primary communication challenges in conference halls is that staff members may be physically spread out across the facility. For example, a staff member may be setting up an event in one area, while another staff member is managing attendees in a different area. This physical separation can make it challenging to communicate quickly and effectively.

Similar to the store clerks example, staff members may have to rely on inefficient communication methods, such as walking around to find their colleagues or using radios or walkie talkies. This can lead to delays in communication, misunderstandings and confusion.

The following are some examples of how the system can improve communications:
1. Event set up coordination. Conference hall workers may need to communicate with each other to coordinate event setups, such as setting up tables and chairs or installing equipment. Using the system, they can use a voice command to call each other and communicate in real time, reducing the need for physical movement and improving event setup efficiency.
2. Event scheduling. Conference hall workers may need to communicate with each other to schedule events, such as coordinating event dates and times or scheduling equipment installations. Using the system, they can use the voice command to call each other and communicate in real time, improving event scheduling efficiency.
3. Technical Support. Conference hall workers may need to communicate with each other to provide technical support to event organizers or troubleshoot technical issues. Using the system, they can use a voice command to call each other and communicate in real time, improving technical support efficiency and event attendee satisfaction.
4. Guest inquiries. Conference hall workers may need to communicate with each other to respond to guest inquiries, such as providing directions or answering questions about event schedules. Using the system, they can use a voice command to call each other and communicate in real time, thereby improving guest satisfaction and event reputation.

5. Event cleanup coordination. Conference hall workers may need to communicate with each other to coordinate event cleanups, such as removing equipment or cleaning up the venue. Using the system, they can use a voice command to call each other and communicate in real time, reducing the need for physical movement and improving event cleanup efficiency.

Hotels

For people who work in hotels, communication is a critical aspect of ensuring a smooth and enjoyable guest experience. Hotel staff members must communicate frequently to coordinate guest requests, manage room cleaning schedules, and troubleshoot any issues that arise.

One of the primary communication challenges in hotels is that staff members may be spread out across the facility, including front desk, housekeeping, maintenance and food and beverage departments. This physical separation can make it challenging to communicate quickly and effectively.

Similar to conference halls and store clerks, hotel staff members may rely on inefficient communications, such as walking around to find their colleagues or using radios or walkie talkies. This can lead to delays in communication, misunderstandings and poor customer service.

The following are some examples of how the system can improve communications:

1. Housekeeping coordination. Hotel workers may need to communicate with each other to coordinate housekeeping tasks, such as cleaning rooms or restocking supplies with the system. They can use a voice command to call each other and communicate in real time, improving housekeeping efficiency and guest satisfaction.
2. Guest services. Hotel workers may need to communicate with each other to provide guest services, such as arranging transportation or making restaurant reservations. Using the system, they can use a voice command to call each other and communicate in real time, improving guest satisfaction and hotel reputation.
3. Front desk coordination. Hotel workers may need to communicate with each other to coordinate front desk tasks such as checking guests in or out, or handling billing issues. Using the system, they can use a voice command to call each other and communicate in real time, improving front desk efficiency and guest satisfaction.

Military

Communication is a critical aspect of military operations and soldiers must communicate frequently to ensure the safety and success of missions. Communication challenges can arise due to a range of factors including physical separation, language barriers, and technological limitations.

One of the primary communication challenges for soldiers is that they may be spread out across a wide area, making it difficult to communicate quickly and effectively. Soldiers may be in different units, vehicles or even different countries depending on the mission. This physical separation can make it challenging to coordinate efforts and share critical information.

The following are some examples of how the system can improve communications:

1. Tactical coordination. Soldiers may need to communicate with each other to coordinate tactical operations, such as setting up a perimeter or executing a maneuver. Using the system, they can use a voice command to call each other and communicate in real time, improving tactical coordination and efficiency and effectiveness without having to use their hands.
2. Equipment requests. Soldiers may need to communicate with each other to request specific equipment or supplies, such as ammunition or medical kits. Using the system, they can use a voice command to call each other and communicate in real time, improving equipment and supply management efficiency.
3. Intelligence sharing. Soldiers may need to communicate with each other to share intelligence information such as enemy locations or situational updates. Using the system, they can use a voice command to call each other and communicate in real time, improving intelligence, sharing efficiency and situational awareness.
4. Medical assistance. Soldiers may need to communicate with each other to request medical assistance or coordinate medical evacuations. Using the system, they can use a voice command to call each other and communicate in real time, improving medical assistance and evacuation efficiency and reducing response times.
5. Control and coordination. Soldiers may need to communicate with each other to coordinate patrol operations, such as checking for suspicious activity or securing an area. Using the system, they can use a voice command to call each other and communicate in real time, improving patrol coordination efficiency and effectiveness.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

3.0. Implementation Mechanisms—Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is device-specific to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display (LCD), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using device-specific hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

4.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising:
   receiving user speech input from a user device;
   converting the speech input to text;
   parsing the text for a command and a contact destination;
   searching a contact list associated with a user of the user device for the contact destination;
   based upon a determination that the contact destination is a user contact in the contact list:
      determining that the user contact is available to receive communications based on a user contact's headset detecting that the user contact is wearing the user contact's headset via in-ear detection;
      based on a determination that the user contact is available to receive communications, creating an audio communication session between the user device and the user contact's headset.

2. The method of claim 1,
   wherein the based upon a determination that the contact destination is a user contact in the contact list further comprises:
      determining whether the user contact is available to receive communications;
      based upon a determination that the user contact is not available to receive communications, notifying the user device that the user contact is not available.

3. The method of claim 1, further comprising:
   causing a user interface to be displayed on the user device that allows a user at the user device to add users to the contact list or delete users from the contact list.

4. The method of claim 1, wherein the contact destination is an artificial intelligence (AI) agent.

5. The method of claim 1, further comprising:
   wherein the contact destination is an artificial intelligence (AI) agent;
   based upon a determination that the contact destination is an AI agent in the contact list:
      determining whether the AI agent is available to receive communications;
      based upon a determination that the AI agent is not available to receive communications, notifying the user device that the contact destination is not available;
      wherein a communication session is created upon a determination that the AI agent is available to receive communications.

6. The method of claim 1, further comprising:
   causing a user interface to be displayed on the user device that allows a user to add artificial intelligence (AI) agents to the contact list or delete AI agents from the contact list.

7. The method of claim 1, further comprising:
   wherein the contact destination is an artificial intelligence (AI) agent;
   based upon a determination that the AI agent is in the contact list:
      determining whether the AI agent is available to receive communications;
      based upon a determination that the AI agent is not available to receive communications, notifying the user device that the AI agent is not available;
      wherein an audio communication session is created upon a determination that the AI agent is available to receive communications;
      wherein the AI agent causes an audio communication session to be created between the user device and another AI agent upon evaluation of additional user speech input from the user device that the another AI agent is able to address.

8. One or more non-transitory computer-readable storage media, storing one or more sequences of instructions, which when executed by one or more processors cause performance of:
   receiving user speech input from a user device;
   converting the speech input to text;
   parsing the text for a command and a contact destination;
   searching a contact list associated with a user of the user device for the contact destination;
   based upon a determination that the contact destination is a user contact in the contact list:
      determining that the user contact is available to receive communications based on a user contact's headset detecting that the user contact is wearing the user contact's headset via in-ear detection;
      based on a determination that the user contact is available to receive communications, creating an audio communication session between the user device and the user contact's headset.

9. The one or more non-transitory computer-readable storage media of claim 8,
   wherein the based upon a determination that the contact destination is a user contact in the contact list further comprises:

determining whether the user contact is available to receive communications;

based upon a determination that the user contact is not available to receive communications, notifying the user device that the user contact is not available.

10. The one or more non-transitory computer-readable storage media of claim 8, further comprising:

causing a user interface to be displayed on the user device that allows a user at the user device to add users to the contact list or delete users from the contact list.

11. The one or more non-transitory computer-readable storage media of claim 8, wherein the contact destination is an artificial intelligence (AI) agent.

12. The one or more non-transitory computer-readable storage media of claim 8, further comprising:

wherein the contact destination is an artificial intelligence (AI) agent;

based upon a determination that the contact destination is an AI agent in the contact list:

determining whether the AI agent is available to receive communications;

based upon a determination that the AI agent is not available to receive communications, notifying the user device that the contact destination is not available;

wherein a communication session is created upon a determination that the AI agent is available to receive communications.

13. The one or more non-transitory computer-readable storage media of claim 8, further comprising:

causing a user interface to be displayed on the user device that allows a user to add artificial intelligence (AI) agents to the contact list or delete AI agents from the contact list.

14. The one or more non-transitory computer-readable storage media of claim 8, further comprising:

wherein the contact destination is an artificial intelligence (AI) agent;

based upon a determination that the AI agent is in the contact list:

determining whether the AI agent is available to receive communications;

based upon a determination that the AI agent is not available to receive communications, notifying the user device that the AI agent is not available;

wherein an audio communication session is created upon a determination that the AI agent is available to receive communications;

wherein the AI agent causes an audio communication session to be created between the user device and another AI agent upon evaluation of additional user speech input from the user device that the another AI agent is able to address.

15. A system, comprising:

one or more processors; and a memory storing instructions, which when executed by the one or more processors, cause the one or more processors to perform:

receiving user speech input from a user device;

converting the speech input to text;

parsing the text for a command and a contact destination;

searching a contact list associated with a user of the user device for the contact destination;

based upon a determination that the contact destination is a user contact in the contact list:

determining that the user contact is available to receive communications based on a user contact's headset detecting that the user contact is wearing the user contact's headset via in-ear detection;

based on a determination that the user contact is available to receive communications, creating an audio communication session between the user device and the user contact's headset.

16. The system of claim 15, wherein the based upon a determination that the contact destination is a user contact in the contact list further comprises:

determining whether the user contact is available to receive communications;

based upon a determination that the user contact is not available to receive communications, notifying the user device that the user contact is not available.

17. The system of claim 15, further comprising:

wherein the contact destination is an artificial intelligence (AI) agent;

based upon a determination that the contact destination is an AI agent in the contact list:

determining whether the AI agent is available to receive communications;

based upon a determination that the AI agent is not available to receive communications, notifying the user device that the contact destination is not available;

wherein a communication session is created upon a determination that the AI agent is available to receive communications.

* * * * *